Dec. 11, 1962 C. O. DENNIS ET AL 3,067,457

APPARATUS FOR HANDLING AND STORING TIRE RECAPPING MATRICES

Filed April 28, 1960 8 Sheets-Sheet 1

INVENTORS
Clement O. Dennis and
William C. Shaver

BY Mason, Fenwick & Lawrence
ATTORNEYS

APPARATUS FOR HANDLING AND STORING TIRE RECAPPING MATRICES

INVENTORS
Clement O. Dennis and
William C. Shaver

BY Mason, Fenwick & Lawrence
ATTORNEYS

Dec. 11, 1962 C. O. DENNIS ET AL 3,067,457

APPARATUS FOR HANDLING AND STORING TIRE RECAPPING MATRICES

Filed April 28, 1960 8 Sheets-Sheet 3

INVENTORS
Clement O. Dennis &
William C. Shaver

BY Mason, Fenwick & Lawrence
ATTORNEYS

INVENTORS
Clement O. Dennis and
William C. Shaver
BY Mason, Fenwick & Lawrence
ATTORNEYS

APPARATUS FOR HANDLING AND STORING TIRE RECAPPING MATRICES

INVENTORS
Clement O. Dennis &
William C. Shaver
BY Mason, Fenwick & Lawrence
ATTORNEYS

APPARATUS FOR HANDLING AND STORING TIRE RECAPPING MATRICES

Filed April 28, 1960 8 Sheets-Sheet 6

INVENTORS
Clement O. Dennis and
William C. Shaver

BY Mason, Fenwick & Lawrence
ATTORNEYS

Dec. 11, 1962 C. O. DENNIS ET AL 3,067,457

APPARATUS FOR HANDLING AND STORING TIRE RECAPPING MATRICES

Filed April 28, 1960 8 Sheets-Sheet 7

INVENTORS
Clement O. Dennis and
William C. Shaver
BY Mason, Fenwick & Lawrence
ATTORNEYS Dec. 11, 1962 C. O. DENNIS ET AL 3,067,457

APPARATUS FOR HANDLING AND STORING TIRE RECAPPING MATRICES

Filed April 28, 1960 8 Sheets-Sheet 8

INVENTORS
Clement O. Dennis and
William C. Shaver

BY Mason, Fenwick & Lawrence
ATTORNEYS

United States Patent Office 3,067,457
Patented Dec. 11, 1962

3,067,457

APPARATUS FOR HANDLING AND STORING TIRE RECAPPING MATRICES

Clement O. Dennis, and William C. Shaver, Macon, Ga., assignors to Precision Recapping Equipment Co., Macon, Ga., a corporation of Georgia Filed Apr. 28, 1960, Ser. No. 25,428
5 Claims. (Cl. 18—6)

This invention relates to apparatus for use in recapping tires, and more particularly to apparatus for loading tires into recapping matrices for curing, storing the loaded matrices during the curing period, and unloading completed tires from the matrices. This application is a continuation-in-part of prior application Serial No. 682,135, filed September 5, 1957 now abandoned.

With the growth of the tire recapping industry and the advent of so-called band type matrices, the problem of handling and storing the matrices during curing has been acute. Although the band type matrix is much smaller and much cheaper than the older stand type with its supporting structure and means for clamping the matrix parts together, and therefore more desirable, it creates new problems of handling and storage. The matrix must be moved to a loader of some kind, loaded, and carried to a place of storage where it can be connected to an electric outlet and remain there until the tire is cured. After curing, the matrix had to be returned to the loading means to remove the retreaded tire. The most perfectly balanced tires are obtained with the matrix lying flat so that the tire weight is evenly distributed, and the new layer of rubber will be uniform around the entire tire circumference. This requires more storage space than when the matrices are arranged vertically. Space limitations in the shops have necessitated either limited production or sacrifice of quality for quantity.

In the above-mentioned application a storage rack was disclosed which provided a plurality of super-imposed slide-out shelves upon which matrices could be placed for storage while curing. The rack contained connections for both electric current and compressed air supply for the stored matrices. The matrices were placed upon and removed from the drawn-out shelves of the rack by means of a suitable hoist. The rack included a shelf upon which the matrices could be placed for loading and unloading tires being recapped.

The object of the present invention is to provide a rack which will have a plurality of slide-out shelves superimposed upon one another to allow a number of matrices to be cured simultaneously while occupying the floor space normally required to cure one tire in a band mold placed upon a stand.

A more specific object is to provide such a rack having means for automatically raising and lowering matrices to and from the slide-out shelves of the rack.

Another object is the provision of a curing rack with an automatic lift which will be self-leveling at the several shelf positions and have means to prevent outward sliding movement of a shelf unless the lift is in position, level with the shelf and held in aligned relation with the shelf rack.

Still another object is to provide means for connecting the matrices to a source of electric current and tires in the matrices to a source of compressed air and maintain the several connections during movement of the matrices to and from tire-loading position.

A further object is to provide means to control the curing period and to cut off the heating elements of the matrices at the end of a predetermined curing time.

Yet another object is the provision of means for loading and unloading tires into and from the matrices, located for automatic positioning of the matrices on the loader by the rack lift.

It is an object to provide means for automatically locking the matrices to the loader as they are lowered into position by the lift, and for automatically releasing the matrices from the loader as the lift moves into position to raise a matrix, A still further object is the provision of a trackway along which the loader may move to allow lower shelves of the rack to be drawn out, with means along the trackway to prevent movement of the rack lift except when the loader is completely clear of the rack and its lift, or in position in front of the rack to receive matrices lowered upon it by the lift.

The invention also contemplates improved loader mechanism.

Other objects of the invention will become apparent from the following description of practical embodiments thereof, when taken in conjunction with the drawings which accompany, and form part of, this specification.

Figure 1:
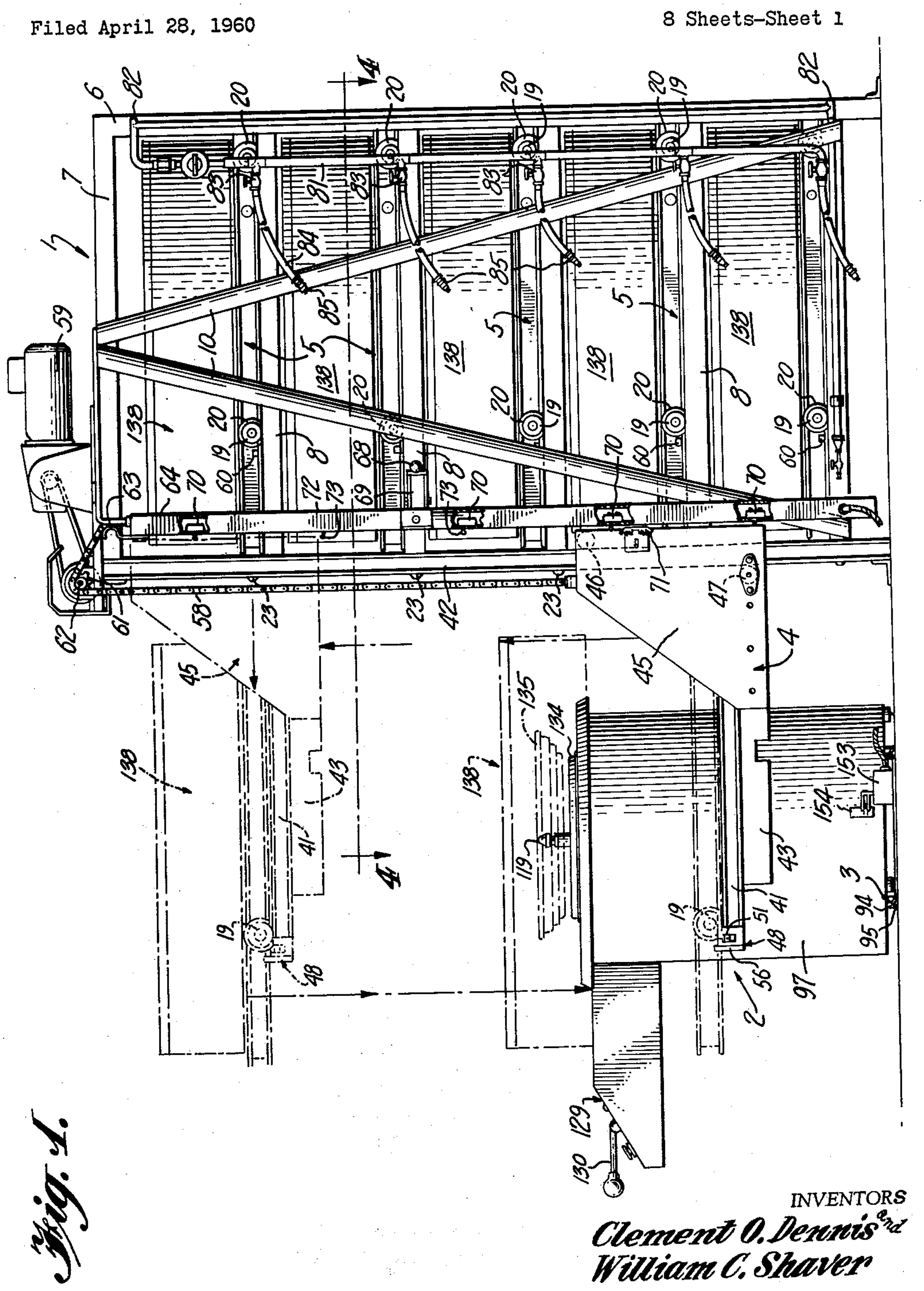
FIGURE 1 is a side elevation of the matrix handling apparatus, the rack lift being shown in full lines in lowered position with a matrix in dotted lines upon the loader, and the lift in dotted lines in raised position with the top rack shelf with a matrix thereon drawn out upon the lift.
Figure 2:
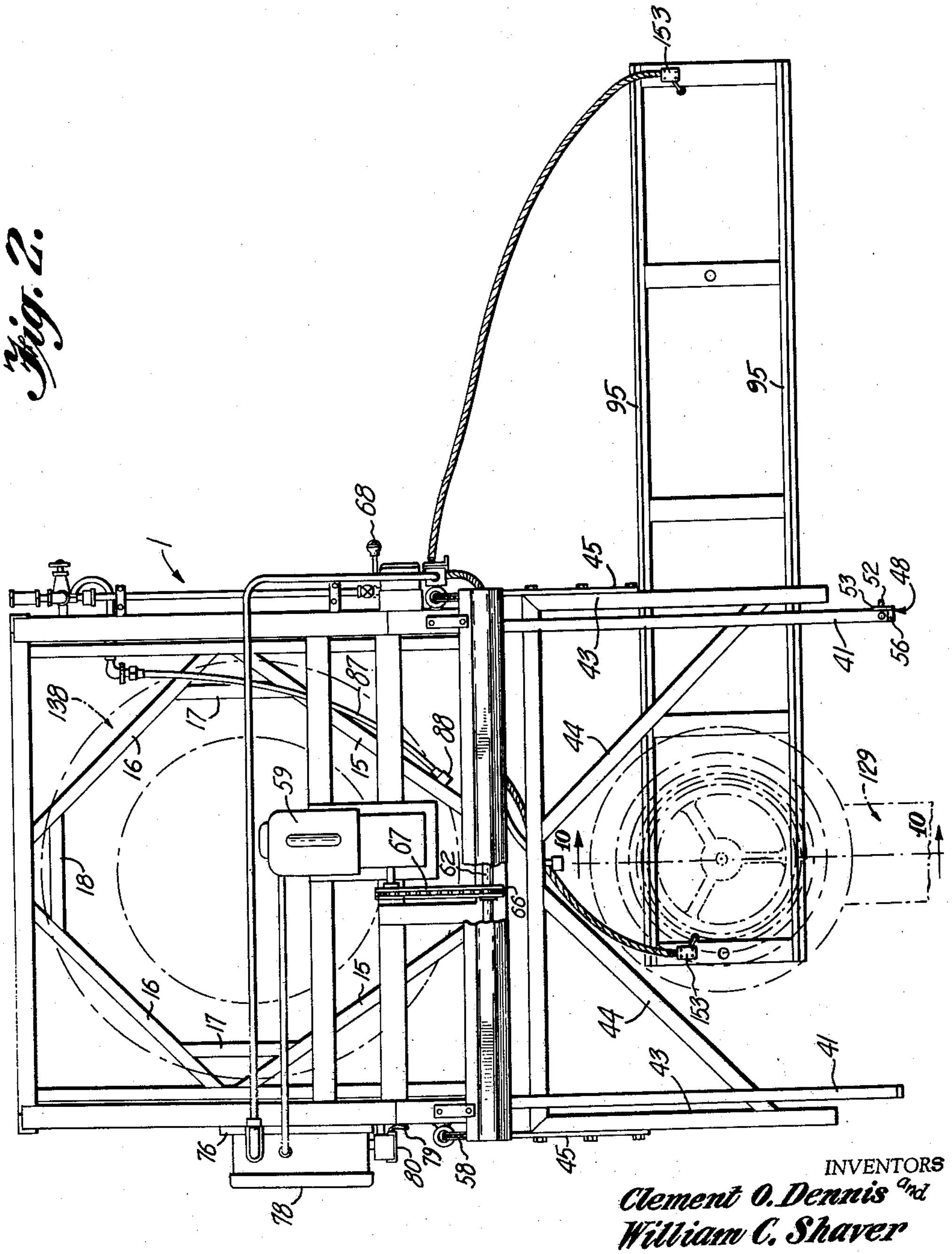
FIGURE 2 is a top plan view of the apparatus shown in FIGURE 1.
Figures 3, 15:
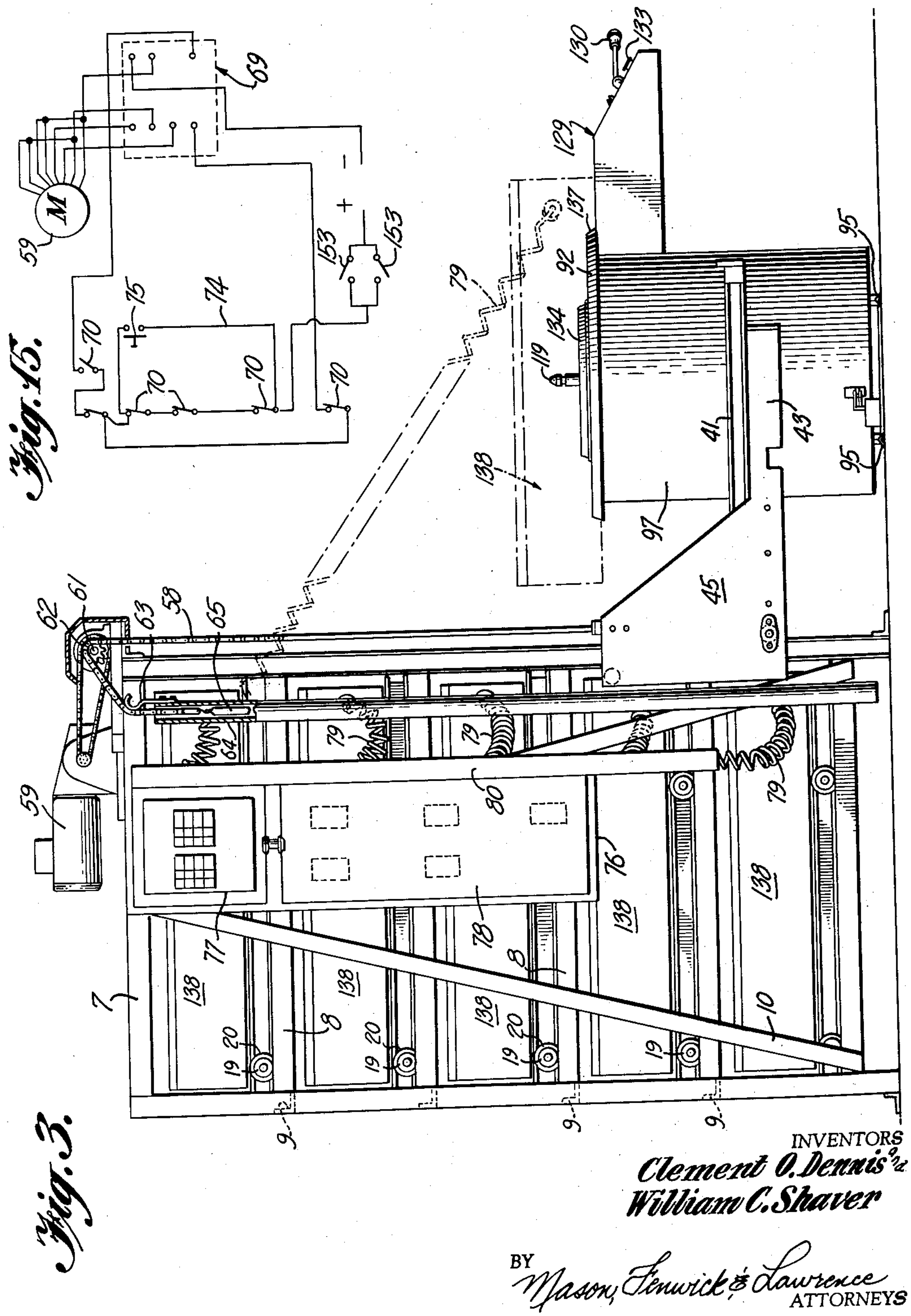
FIGURE 3 is a side elevation of the apparatus viewed from the opposite side.
FIGURE 15 is a diagrammatic view of the electrical control circuit for operating the rack lift mechanism.
Figure 4:
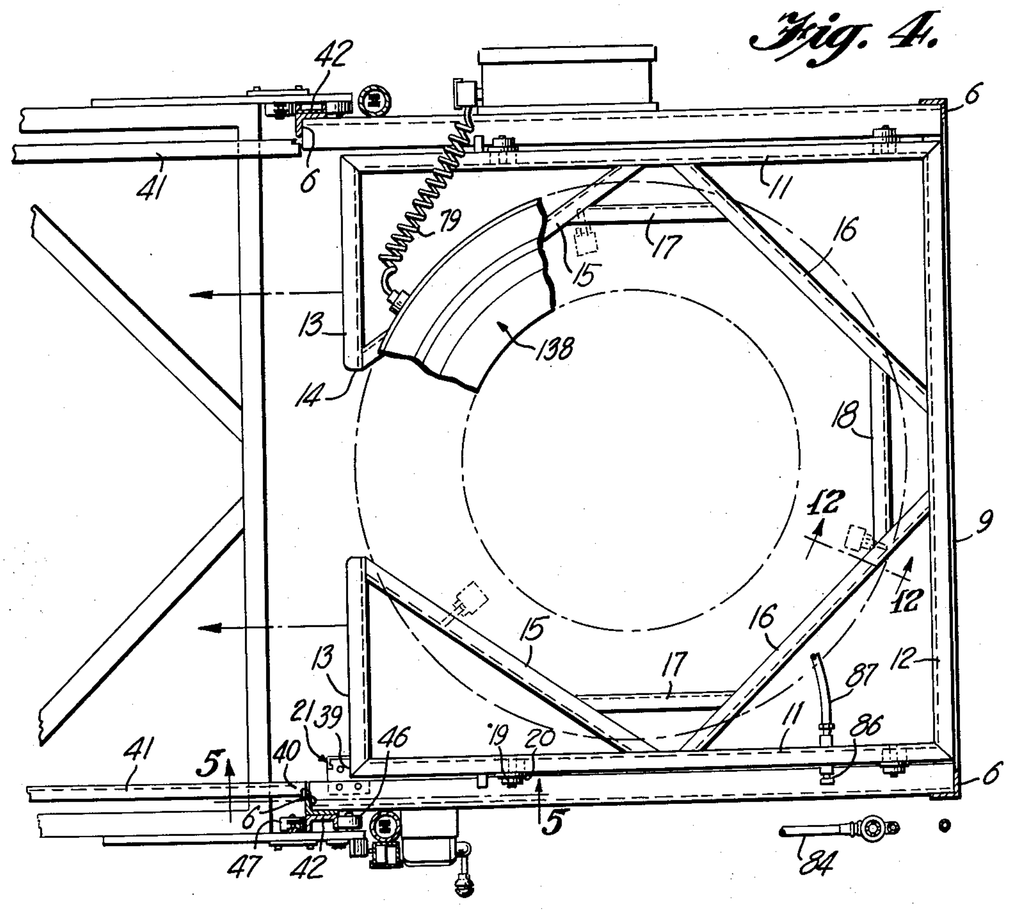
FIGURE 4 is a horizontal section through the rack portion of the apparatus, taken on the line 4—4 of FIGURE 1.

In general, the tire handling apparatus of the present invention includes as its elements a device for loading tires to be recapped into and removing completed tires from matrices in which they are cured, a storage rack for loaded matrices during tire curing periods, and means for moving matrices to and from the loader and rack.

Referring to the drawings in detail, there is shown a storage rack 1 for loaded matrices; a tire loader 2, movable along a track 3 to a loading position in front of the rack and to a position removed from the rack; and, a lift 4 carried by the rack and operatively associated with the loader when in front of the rack, for moving matrices from the rack and depositing them upon the loader, and lifting matrices from the loader to levels from which they may be rolled from the lift onto the guide rails of the rack.

The rack is of open frame construction, and is designed to include a number of superimposed shelves 5 upon which matrices may be stored for curing. The rack has four angle-iron, vertical, corner posts 6, which are tied together at their tops by rectangular framing 7. The front and rear posts on each side are joined by horizontally positioned, vertically spaced guide rails 8 for the shelves. The guide rails are in pairs, one rail of the pair being on each side of the rack and the two rails being at the same level. The rails also serve as braces for the rack. Suitable connectors 9 extend between the rear posts of the rack. Angularly positioned braces 10 may be used at the sides to rigidify the structure.

The structure above defined provides a rack having pairs of guide rails vertically spaced to provide tracks upon which the shelves 5 may rest, or upon which the shelves may roll in moving onto the lift or from the lift into the rack. Thus, a number of positions are provided to receive a plurality of matrices in superimposed relation.

The shelves 5 are of particular construction, not only to provide support for matrices, but to enable the shelves to move down over the top of the loader and leave the supported matrix seated in loading position on top of the loader. To this end, the shelves are provided with side channel members 11 having their open sides outwardly and connected at their rear by a back channel 12. Short channel sections 13 extend from the front ends of the side members toward one another, but terminate short of one another to leave an opening 14 at the center of the front. The inner ends of the front members 13 are connected to the side members 11 by angularly positioned matrix seating members 15. Similar members 16 connect the side and back members of the shelves, so that a generally diamond shaped support is formed for the matrix to seat upon. Braces 17 connect the members 15 and 16 adjacent the sides of the shelves, and a brace 18 connects the members 16 adjacent the back. This forms a rigid shelf member which will carry the heavy loaded matrices without material twisting or warping.

Each shelf is provided with four wheels 19 adapted to be supported upon, and roll on, the guide rails 8 provided for the shelf. The wheels 19 are flanged, and have their flanges 20 inboard of the guide rails to prevent transverse shifting of the shelf relative to the rack.

Figure 5:
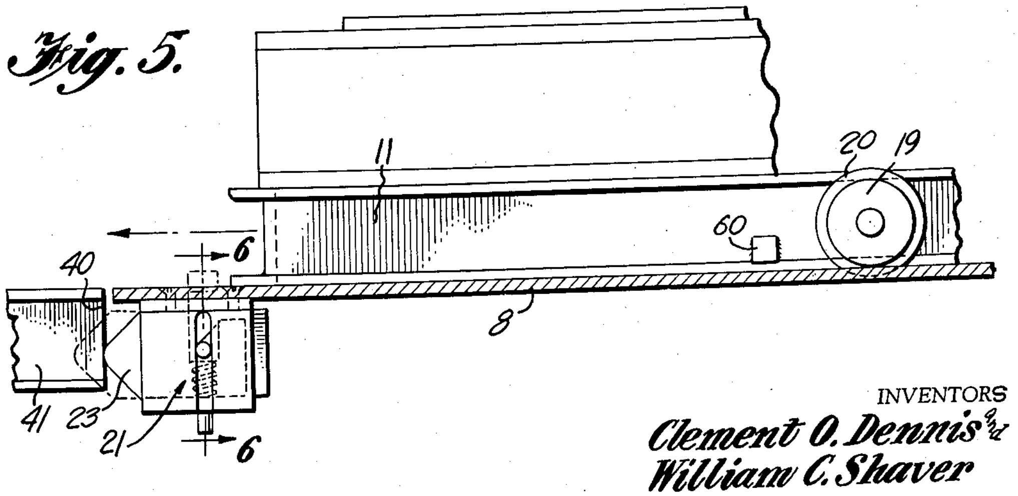
FIGURE 5 is a partial vertical section through a shelf member, showing the shelf and matrix, the rack lift in place to receive the shelf, and the shelf lock tripped by the lift, and is taken on the line 5—5 of FIGURE 4.
Figures 6, 7:
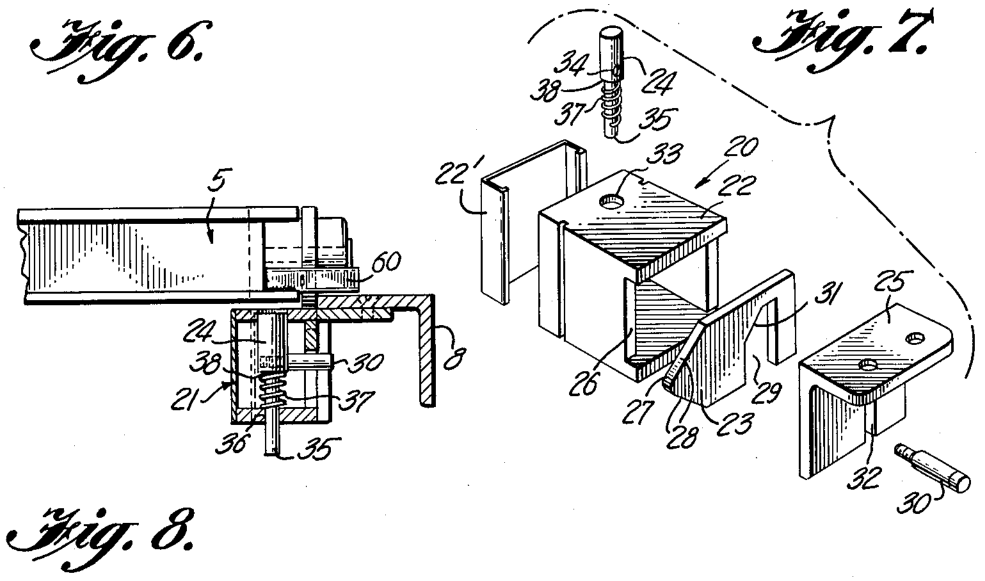
FIGURE 6 is a vertical section taken on the line 6—6 of FIGURE 5.
FIGURE 7 is an exploded perspective view of the shelf lock mechanism.
Figure 8:
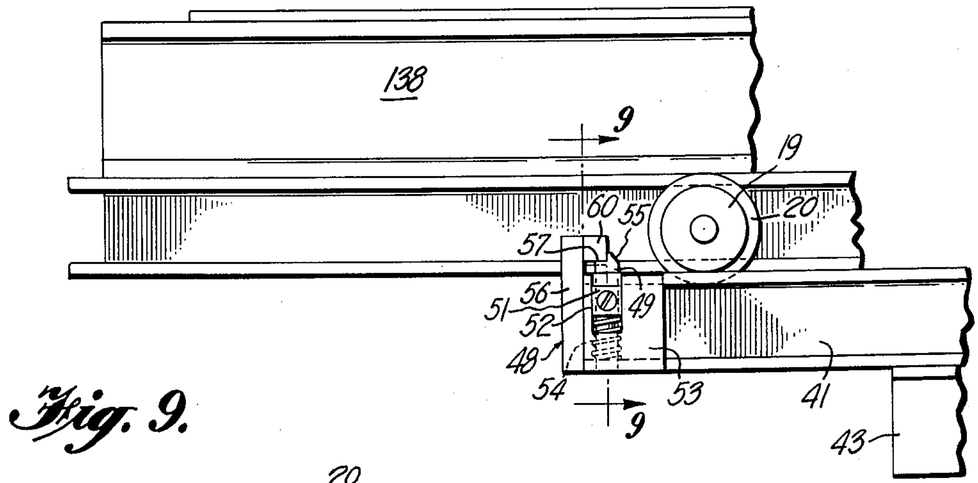
FIGURE 8 is a side view of the lift with a shelf in place thereon and the interlock mechanism for attaching the shelf to the lift.
Figure 9:
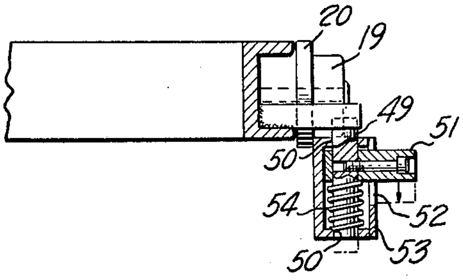
FIGURE 9 is a vertical section taken on the line 9—9 of FIGURE 8.
Figures 10, 14:
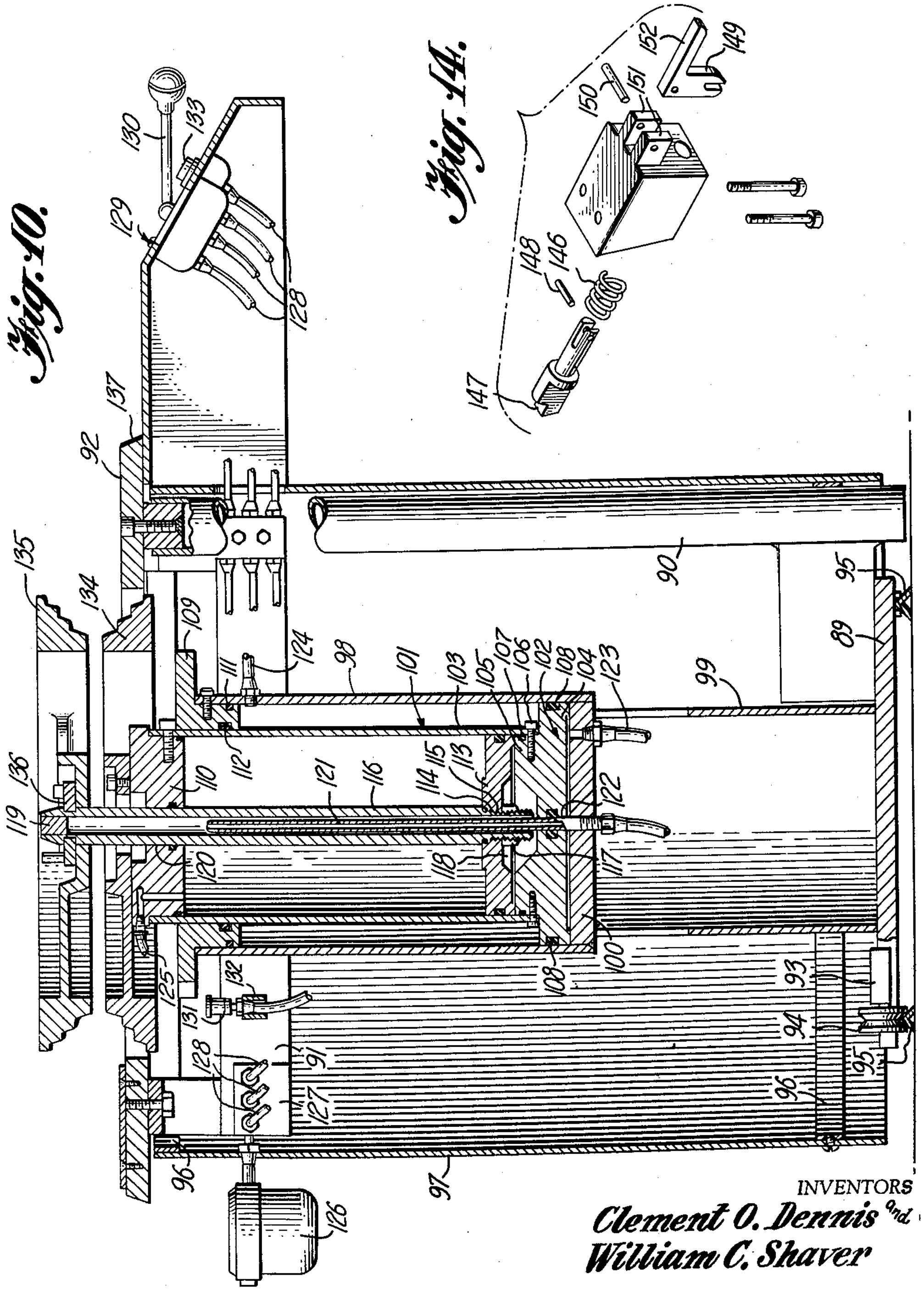
FIGURE 10 is a vertical section through the loader portion of the apparatus, and is taken on the line 10—10 of FIGURE 2.
FIGURE 14 is an exploded perspective view of the matrix latch mechanism.
Figure 12:
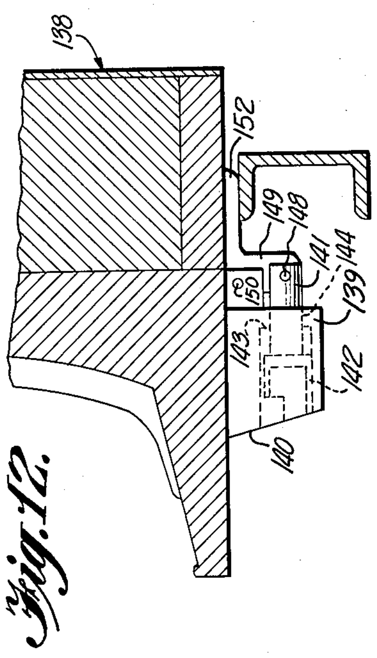
FIGURE 12 is a detail section taken on the line 12—12 of FIGURE 4, illustrating the latch mechanism carried by the matrices for attaching to the loader, with the latch held in released position by engagement of the latch trigger by the shelf upon which the matrix is placed.
Figure 13:
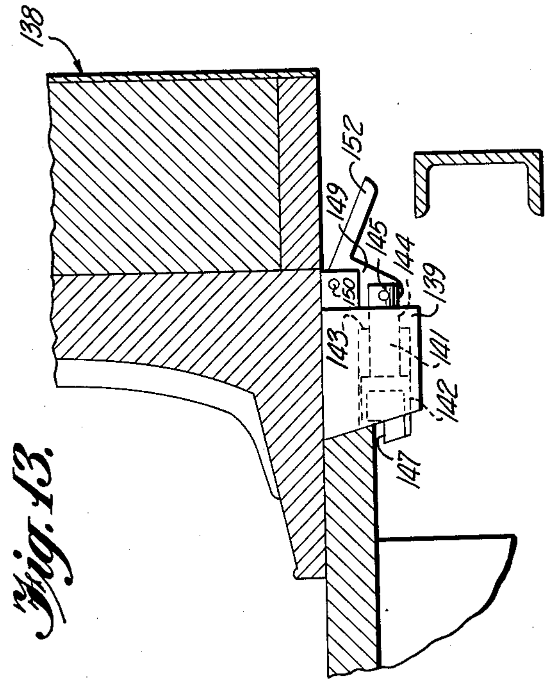
FIGURE 13 shows the latch mechanism in released position with the matrix separated from the rack shelf.
Figure 11:
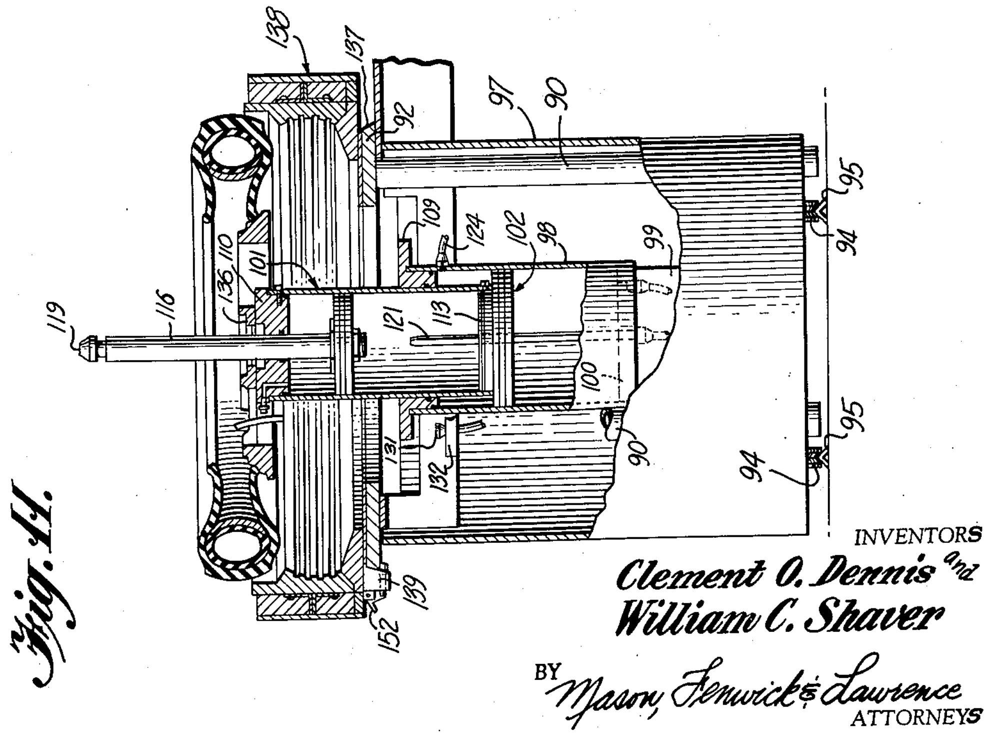
FIGURE 11 is a view of the loader, similar to FIGURE 10, with the loader spindle raised and a matrix in position on the loader ready to receive a tire.

The shelves are normally held against withdrawing movement by reason of a lock 21 located at one end of one of the guide rails (see FIGURES 5 to 7). The lock consists of a housing 22, a sliding trip 23, a locking pin 24 and a mounting bracket 25. The housing is of rectangular cross-section and has one end closed by the mounting bracket 25. The opposite end of the housing is closed by a spring clip 22'. The side walls of the housing are recessed at their edges adjacent the mounting bracket to form a guideway 26 for the sliding trip 23. The trip is a flat member having a tapered nose 27 with oppositely inclined cam surfaces 28, which are contacted by an operator member, as will be described, to cause linear movement of the trip to release the lock. The trip also is notched from its bottom to provide a control slot 29 through which an actuator arm 30 of the locking pin will project. The slot will have a rearwardly inclined cam surface 31 to draw down the locking pin actuator arm as the trip is pushed rearwardly. The mounting bracket also has a slot 32 through which the actuator arm 30 projects. The slot 32 is relatively narrow, and serves as a guide slot to hold the actuator arm to a predetermined vertical line of travel. The locking pin is slidably mounted in a hole 33 in the top of the housing 22, so that it may project substantially above the top of the housing when in locking position. The actuator arm is in the form of a pin which is threaded into an opening 34 in the side of the locking pin. The actuator arm, striking the top of control slot 29 in the trip arm, will serve as a limit stop to determine the extended position of the locking pin. When the trip is moved rearwardly, cam surface 31 of the control slot will engage the actuator arm and force it downwardly, withdrawing the locking pin from locking position. In order to ensure automatic upward movement of the locking pin when rearward pressure is removed from the trip, the pin has a stem 35 of reduced diameter below the threaded opening 34. The stem slides in an opening 36 in the bottom of the housing, and a coil spring 37 surrounds the stem and bears upon the housing bottom and the shoulder 38 at the juncture of the stem and enlarged bolt portion of the locking pin to exert an upward pressure on the locking pin. Thus, as soon as pressure is released from the trip, the spring 37 will force the locking pin upwardly into locking position, and the actuator arm 30, riding on the cam surface 31 of the control slot, will move the trip forwardly to inoperative position.

The lock mechanism is mounted at one end of one of the guide rails of each of the pairs of guide rails for the shelves, and in front of each shelf, so that the horizontal path travelled by the shelf corner 39 as the shelf is moved outwardly is intersected by the locking pin. Thus, the shelf will be held against withdrawal from the rack except when the lock is released.

The lock trip is actuated by an operator member 40 carried by the lift 4, which in fact is no more than one end of one of the track members 41 supported on the lift to receive the shelves 5. The trip will be actuated and held in position to maintain the locking pin withdrawn when the lift has its track members 41 in horizontal alignment with the guide rails 8 in the rack.

The lift is mounted for sliding movement along vertical rails 42 mounted at the sides of the rack at the front. In fact, the lift rails are positioned against and coextensive with the front corner posts 6 of the rack. The rails are channel members, attached to the rack corner posts so as to be outwardly opening.

The lift consists of a horizontally positioned, forwardly opening, U-shaped frame 43, with angularly positioned braces 44 extending from the legs to the base of the U-frame. Mounting plates 45 are connected to the sides of this frame at the base end, and lie vertically to embrace the forward portion of the rack and overlie the vertical rails 42. Rollers 46 are carried by plates 45 near their upper edges to ride along the rear surfaces of the rails 42, and rollers 47 are mounted on plates 45 near their lower edges to roll along the front surfaces of the rails. Weight distribution will cause both rollers to be load-bearing and be held in rolling contact with the rails. The shelf-supporting track members 41 are mounted upon the U-frame 43 and braces 44 in spaced apart, parallel relation, to form continuations of guide rails 8 when the lift is leveled at a selected shelf position.

When the lift is leveled at a shelf position, the track end 40 will release the lock 21 and the shelf, with its matrix, may be rolled out of the rack onto the lift. In order to hold the shelf against movement on the lift, an interlock 48 is provided. This consists of a spring-pressed latch 49 slidable through holes 50 formed in the webs of one of the channel track members 41 at its extreme outer end. An operating handle 51 is fixed to the latch and extends outwardly through a slot 52 in a bridge plate 53 welded to the web edges of the channel track members 41. A spring 54 surrounds the latch between the bottom web of the channel and the latch handle to urge the latch upwardly. The latch has the leading face of its protruding upper end beveled, as at 55, so that stop pins 60 projecting from the sides of the shelf will depress the latch as the shelf moves into position on the lift. A fixed stop 56 projects upwardly form the end of the track member to limit the movement of the shelf onto the lift. The latch has a notch 57 in its rear face to seat the pin 60 and prevent reverse movement of the shelf. Thus, the interlock between the shelf and lift will be automatic. When the shelf is to be rolled from the lift into the rack, the handle 51 is pulled down, withdrawing the latch from the path of the stop pin, and the shelf will be free to roll into the rack.

The lift is moved along the rails to the different shelf positions by means of a chain suspension means 58, operated by a motor 59 mounted on top of rack 1. The chains have their ends connected to the mounting plates 45 and pass over driving sprockets 61, fixed to shaft 62, journalled on top of the rack. The chains also pass around chain guides 63 mounted at the tops of guide tubes 64 into which the chain ends hang. Weights 65 are attached to the free ends of the chains to ensure the chains hanging straight and moving freely in the chain tubes 64. Drive shaft 62 carries a drive sprocket 66 over which a chain 67 from the motor 59 passes. The motor is a reversible one, and its operation will cause the lift to move upwardly or downwardly as desired.

The motor is controlled by means of a switch lever 68 on a switch box 69, mounted on the side of the rack. The switch is arranged so that lifting the switch lever causes the lift to rise, and lowering it causes the lift to move downwardly.

In order to provide for automatic stopping and leveling of the lift at the several shelf positions, a micro-switch 70 is mounted adjacent each shelf and included in series in the motor circuit. The micro-switches are normally closed, and the lift carries an actuator 71 which strikes the switches 70 as the lift moves along its tracks to break the motor circuit and bring the lift to a halt. The actuator has sufficient vertical length so that whether the lift is going up or down the lift tracks will stop level with the selected shelf rails. The micro-switches are mounted in an electric wire trough 72, fastened along the side of the rack, and have their control buttons 73 projecting for contact by the actuator 71.

It is frequently desired to move the lift further than to the next shelf, and it is therefore necessary to provide means to prevent the lift from stopping as it reaches each shelf. To this end, a bypass line 74 is provided which is shunted across the micro-switches and includes a switch 75. Closing switch 75 completes a bridge across the micro-switches and prevents stopping of the lift before reaching its desired destination.

The rack is provided with an electrical mounting panel 76 which carries circuit breaker box 77 and time clock box 78. There will be one circuit breaker and one time clock connected to each matrix power cord 79. The wiring interconnecting these various parts runs through a wire trough 80, and the power cords 79 extend from the trough at each shelf position. These cords are preferably coiled, or otherwise extensible, so that when connected to a matrix, the matrix can be removed to the loader, as will be described, without disconnecting the power cord.

Thus, the matrices may be kept hot at all times and need not cool off during loading and unloading.

On the opposite side of the rack from the electrical components, there is a compressed air manifold 81. The manifold can be connected to a source of compressed air by connections 82 to either the top or bottom of the manifold. The other end will be plugged. The manifold has a T-fitting and valve assembly 83 at each shelf station, and short hoses 84 having quick couplers 85 at their ends lead from the valves. Hoses 84 are connectible with nipples 86 on the several shelves, and hoses 87 lead from these nipples and have connectors 88 for connection to the valves of tires being cured.

During operation of the apparatus, the matrices are removed from the shelves onto the lift and lowered to the loader 2. The loader is precisely positioned relative to the rack by its track 3, and the shelves with their matrices are definitely positioned relative to the lift by the interlock 48 between the lift and shelves. This will insure the matrix being lowered so as to be precisely positioned on the loader.

The loader is of the general type disclosed in a copending application of James R. Maddox and Anthony T. Fassero, Serial No. 849,036, filed October 27, 1959. The present loader differs from the one shown in that application primarily in the arrangement and operation of the cylinders which control the movements of the loader.

The loader is constructed upon a base frame which includes a base plate 89, a plurality of legs, or posts 90, a bridge and cylinder support 91 and a top plate 92.

The base plate 89 is in the form of a disk and carries a plurality of wheel-supporting bars 93. Suitable rollers, or wheels, 94 are rotatably mounted on the bars. The wheels may be grooved to ride on rails 95 of the track 3, so that the loader may be freely moved along a fixed course. Rings 96 are fixed to the posts near their tops and bottoms, to which a cover, or housing, 97 is fastened to form a body for the loader and enclose the working parts.

Within the upright body unit, the cylinder support attached to the bridge member 91 takes the form of a closed bottom cylinder 98. A suitable support 99 extends from the base plate to the bottom 100 of cylinder 98. A second cylinder 101, having an enlarged head 102, fits within the cylinder 98. The second cylinder includes a tubular wall member 103, and carries a piston 104 for sliding movement in the cylinder 98 and which forms the enlarged head, and has a reduced concentric portion 105 which fits within, and closes, the bottom of the tubular member 103. The piston is connected to the tubular wall member by screws 106 which pass through the wall into the reduced portion of the piston. A suitable sealing ring 107 may be used between the cylinder wall and reduced portion of the piston to make the joint leak-proof. The piston fits slidably within the cylinder 98. The piston will have one or more sealing rings 108. A flanged annulus 109 is seated within the top of cylinder 98 to slidably embrace and guide the second cylinder wall member 103 and form a head for cylinder 98. A head 110 fits within, and is fixed to the top of the cylindrical member 103. The annulus 109 is sealed against the cylinder 98 by ring 111, and against cylinder 103 by ring 112.

A piston 113 is slidably mounted within the cylinder 101. The piston has central opening 114 which is bored and taped to receive the threaded end 115 of a hollow piston rod 116. A nut 117 on the lower projecting end of the rod locks the rod to the piston 113. It is to be noted that piston 113 and the reduced neck of the head 102 are oppositely recessed in their adjacent faces to provide a chamber 118 when the piston 113 is in its lowermost position, and into which the lower end of the hollow rod 116 opens. The upper end of the hollow rod is closed by a plug 119. Piston rod 116 projects slidably through an opening 120 centrally of the upper cylinder head 110. An air pipe 121 extends vertically through the bottom 100 of cylinder 98 to slide through an opening 122 in the lower head 102 of the inner cylinder 101 and project up into the hollow rod 116. A second air line 123 extends through the bottom 100 of cylinder 98 to open into the space between the bottom 100 and the piston 104. An air line 124 opens through the wall of cylinder 98 into the annular chamber between the two cylinders to control air pressure on the upper side of piston 104. A fourth air line 125 opens through cylinder head 110 into cylinder 101.

The several air lines are supplied with compressed air from a suitable source. The air will enter the unit through an air filter 126, and through a distributor box 127. Suitable hose lines 128 will lead to a control panel 129 where there are four-way valves 130 for connecting the air lines 121, 123, 124 and 125 to the compressed air source or bleeding them to atmosphere.

A tire inflation hose 131 is held in a bracket 132 for connection to a back-up tube in a tire being mounted in a matrix to supply initial inflation. A button 133 on the control panel will operate the line.

Air cylinder 101 is used to support a tire to be loaded, and to compress the beads of the tire to reduce its diameter. To this end, the cylinder carries a pair of tire supporting wheels 134 and 135. The bottom wheel 134 is permanently fixed to the head 110 of the cylinder, and the top wheel 125 is removably attached to the piston rod 116. These wheels are described in detail in the above-mentioned Maddox et al. application, along with the spring catch 136 which releasably holds the top wheel on the piston rod.

The top plate 92 of the loader has a circular rim 137 which declines outwardly around its entire circumference. This plate is dimensioned so that the band type matrix 138 to be used with the apparatus will seat upon it. In order to properly position the matrix upon the plate, the matrix is provided with a plurality of lugs 139 spaced around its bottom, each having an inclined face 140 to engage the rim of the loader top plate and lead the matrix to a centered position on the loader as it is lowered into place by the apparatus lift. Each lug carries a latch member which is automatically operable to lock the matrix to the loader top plate so that the matrix will not lift from the loader plate even though force may be necessary to lift a tire from the matrix. The latch consists of a bolt 141 mounted within a recess 142 opening into the inclined face of the lug and having a bottom 143. The lug is drilled centrally of the recess from the bottom of the recess to the opposite side to provide an opening 144 through which the stem 145 of the bolt may slide. A spring 146 surrounds the stem and bears against the head 147 of the bolt and the bottom of the recess to urge the bolt into rim-engaging position. The end of the stem is bifurcated, and pivotally connected, by pin 148, to one arm of a trip lever 149. The lever is of the bell-crank type, and is pivoted at its center by pivot pin 150 to ears 151 projecting outwardly from the lug 139. The free end 152 of the bell-crank lever 149 serves as an actuating member to hold the latch retracted when the matrix is not upon the loader plate. The several latches are positioned around the matrix bottom so that each of the trip arms 152 will rest upon one of the channel members making up the shelves when the matrices are placed upon the shelves. This will rock the trip levers to retract the latch bolt. When the lift lowers a matrix upon the loader top plate, it continues downward with the shelf leaving the matrix centered upon the loader plate. As the shelf leaves the matrix, the trip will be freed and the latch spring will urge the bolts outwardly to underlie the loader top plate rim.

In order to ensure proper positioning of the loader before operation of the lift, the track 3 has micro-switches 153 located at its ends. These are connected into the operating circuit for the motor 59 which controls the lift so that at least one of them must be closed to complete a circuit through the motor. These switches are closed by actuators 154 fixed to opposite sides of the loader. Thus, the loader must be positioned at one end of the track to receive matrices from the rack, or at the other end of the track completely out of the way of the lift in order for the lift to be operative. This will prevent breakage of equipment by improper location of the loader when the lift is operated.

In operating the apparatus, matrices will be placed upon each of the shelves of the rack. This will be a convenient manner for storing the matrices and they will always be ready for use. When it is desired to cure a tire, the loader is first moved to its position in front of the rack and completely to the end of its track so that it will close the switch 153. If the top matrix is to be loaded, the switch lever 68 is moved to the "Up" position to close a circuit to the lift motor 59. The lift will start its upward movement, but will stop as soon as its actuator 71 contacted the micro-switch 70 at the next upper shelf level unless the by-pass switch 75 is actuated to prevent it. The by-pass switch 75 will be held closed until the actuator 71 on the lift has passed the micro-switch 70 at the next to the top shelf position and it will then be released. As soon as the lift actuator strikes the micro-switch button at the top shelf position, the circuit to the motor will be broken and the lift will come to rest with its track members 41 level with the guide rails 8 at the top shelf position. As the lift reaches this position, the end 40 of one of its trackways will strike trip 23 of the shelf lock 21, to retract the locking pin 24 from in front of the shelf so that the shelf may be rolled freely out of the rack onto the tracks of the lift. As the shelf reaches that point on the lift which will place the matrix directly over the loader and approximately concentric with the loader plate, the stop pins 60 on the sides of the shelf will strike and depress the latches 49 of the interlock 48 and after passing over the latches will contact the fixed stops 56 on the lift and come to rest. The latches 49 will rise up into place behind the pins 60 so that the shelves will be held against movement in either direction. The switch lever 68 is then moved to a downward position and the lift will start its downward movement. The by-pass switch 75 must again be closed so that the lift will not stop at the several lower shelf positions. The lift will continue its downward movement until both the lift and the shelf pass over the top of the loader and let the matrix come to rest upon the loader top plate. The bevel faces of the lugs 139 will cause the matrix to be properly centered upon the loader and, as the matrix comes to rest upon the plate, the latch bolts 141 will snap into locking position under the loader plate rim, locking the matrix to the rim. The matrix top plate, or flange, will then be removed in a manner well understood in the art. The proper control valve 130 of the loader will be operated to admit air through air line 123 to the bottom of cylinder 98 and open air line 124 to atmosphere. This will cause the cylinder 101 to rise within the cylinder 98, raising both tire wheels 134 and 135 above the top of the matrix. The other control valve 130 will be operated to admit air through pipe 121 into the hollow piston rod 116 and then downwardly through the piston rod into the chamber 118 beneath the piston 113, so that this piston and its piston rod 116 will rise within the cylinder 101 to lift the top wheel and cause the two tire wheels to separate. The top wheel 135 will then be removed from its supporting rod by releasing the spring catch 136. A tire to be recapped, having its layer of new rubber in place, will then be placed over the rod 116 to seat upon the lower tire wheel 134. The top wheel 135 will then be replaced upon the rod 116 and the appropriate control valve 130 operated to admit air through air line 125 to the top of the piston 113, to draw down the top tire wheel towards the lower tire wheel. Of course, at the same time, air line 121 will be open to atmosphere. When the tire wheels have been brought sufficiently close together to have compressed the tire beads to the extent necessary to reduce the tire diameter sufficiently to permit the tire to move into the mold, the air line 123 is opened to atmosphere so that the inner cylinder may descend by gravity to its lower position, to allow the tire to seat within the mold. If, for any reason, the tire will not move into the mold by gravity, air may be admitted through line 124 to exert its pressure upon the top of piston 104 to pull the tire into its position within the matrix. After the tire has reached its proper level, air pressure will be admitted through line 121 to the bottom of piston 113 to lift somewhat the upper tire wheel and allow the tire beads to spread and the tire to seat itself within the matrix design. The top matrix plate, or flange, is then replaced.

The inflation hose 131 will be connected to the valve of the air bag. With the beads of the tire still under the positive alignment control of the wheels 134 and 135, inflation button 133 on the control panel 129 is depressed. As soon as the pressure in the air bag reaches that which is sufficient to firmly seat the tire in the matrix, a suitable signal will be given, and the air hose can be disconnected and the hose 87 coupled to the air bag valve. Piston 113 is then extended, raising wheel 135 away from the tire bead. Top wheel 135 is removed and piston 113 is retracted. During this entire operation, the matrix has remained connected to its electrical power source through the extensible power cords 79.

The matrix is now ready for removal from the loader. The lift switch lever 68 will be moved to its upper position which will cause the lift with its supported shelf to rise and the shelf to move up under the bottom of the matrix. As the shelf moves into position its frame members will contact the free ends of the trip levers 149, retracting the latch bolts 141 to release the matrix from the loader plate. The matrix is then free to move upwardly with the lift and in its proper position on the shelf. When the lift reaches the top shelf position it will automatically stop. The operator can then draw down on the handle 51 of the interlock 48 to retract latches 49, so that the shelves will be freed for rolling off of the lift onto the rails 8 of the rack for storage during the curing period. As soon as the shelf is in proper position on the rack, the hoses 84 can be coupled to the nipples 86 and the air bags will be inflated to proper pressures and held at the proper pressure during the curing period.

Matrices from all of the shelves of the rack can be handled in the same manner as just described with the exception of those on the two bottom shelves. It will be apparent that the two bottom shelves cannot be rolled outwardly from the rack with the loader in loading position. In order to remove these shelves, it is necessary to move the lift upwardly above the loader top and then move the loader along its track until it strikes the micro-switch 153 at the opposite end of the track. The lift can then be lowered to the level of the supporting rails of the shelf to be removed and the shelf drawn outwardly on the lift. It will then be necessary to raise the lift again, move the loader back into position in front of the rack with the micro-switch closed at that end of the loader track, and then again lower the lift to allow the matrix to come to rest upon the loader top plate. The lift, due to its U-shaped formation, and the shelf, because of its open front construction, will be free to move down over the loader.

Through the use of the apparatus disclosed herein all manual handling of the matrix is eliminated. The several matrices may be brought into proper position, loaded and returned to their positions on the shelf entirely through the mechanical operation of the apparatus. Due to the fact that the matrices remain connected to their electrical supply source they never have an opportunity to cool off. The apparatus enables the operator to handle with ease a number of recapping operations and to store the matrices during curing in a minimum of space.

Figures 16, 17, 18, 19, 20:
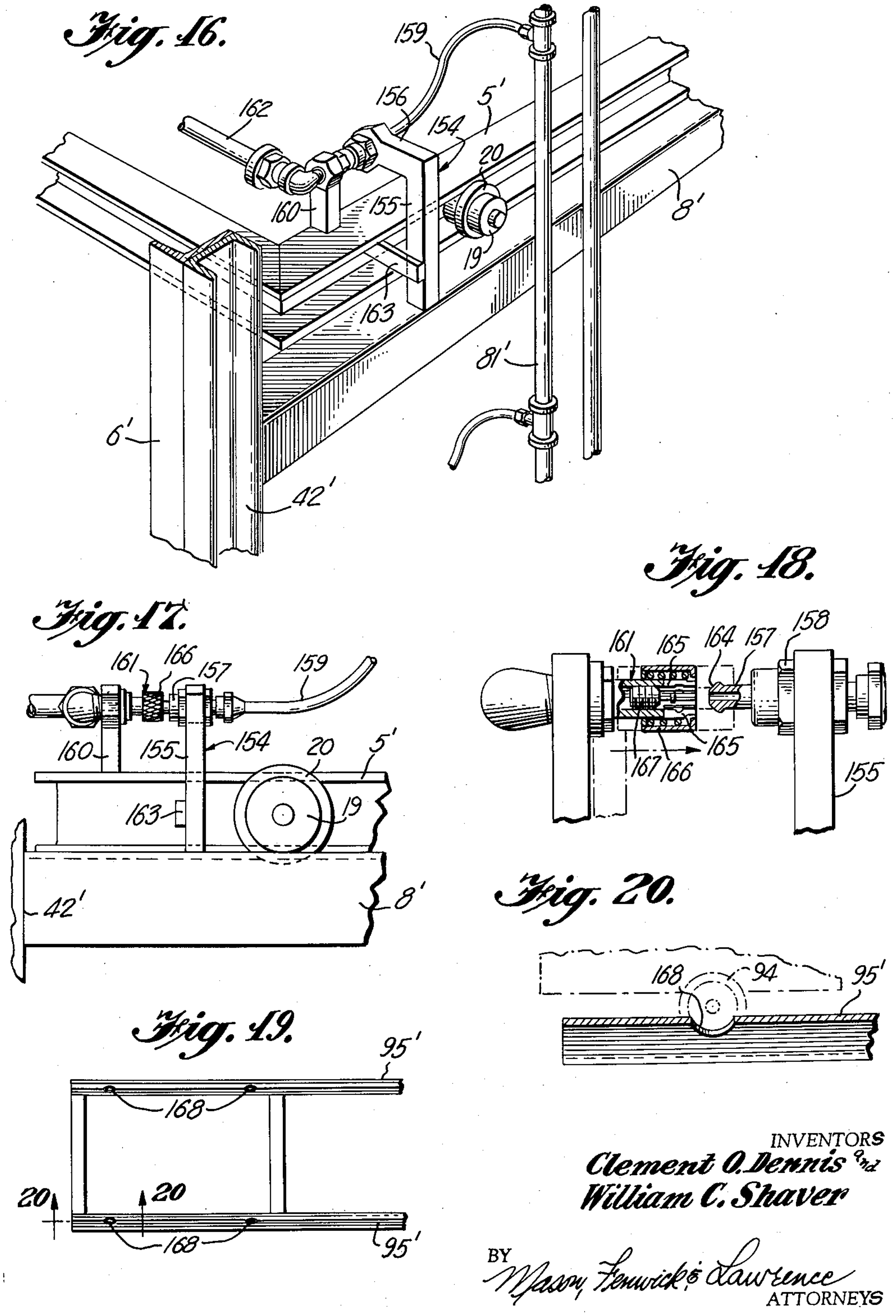
FIGURE 16 is a fragmentary perspective view of a portion of the frame and one shelf illustrating the modified air coupling and shelf lock.
FIGURE 17 is a side elevation of a portion of the structure shown in FIGURE 16.
FIGURE 18 is an enlarged view of the air coupling and lock shown in uncoupled position and with parts in section.
FIGURE 19 is a top plan view of a portion of the loader track showing a different arrangement for locating the loader with respect to the track.
FIGURE 20 is a view taken on the line 20—20 of FIGURE 19.

In FIGURES 16 to 18 a modified interlock between the rack and shelf is illustrated. In this case the interlock includes an automatic coupler for connecting the shelf air line to the air manifold.

In accordance with the modified structure, the air manifold 81′ is located closer to the front corner post 6′ of the rack frame. Only a portion of the front post 6′, vertical lift rail 42′, one guide rail 8′ and a corner of a shelf 5′ have been shown. In the modified version, a bracket 154 is fixed to the frame guide rail 8′ and consists of a vertical leg 155 and a horizontal inwardly projecting arm 156 at a sufficient height above the rail 8′ to overlie a shelf 5′. The inner end of the horizontal arm 156 has an aperture into which a male coupling member 157 is held. The coupling can be located in place by means of a nut 158. The male coupling will be connected by a hose line 159 to the air manifold 81′.

Shelf 5′ has a vertical post 160 which carries a female coupler member 161. The female connector carries a line 162 by means of which the air can be carried to an air bag in a tire on the shelf. The shelf is also provided with a stop bar 163 which projects from the side of the shelf and is adapted to strike the vertical leg 155 of the bracket 154 when the shelf is in its fully retracted position and the coupler members are engaged. By the use of the stop bar the coupler elements are relieved of strain which might otherwise be imposed if the full inertia of the heavy shelf and matrix had to be absorbed by the coupler.

The coupler which is used can be any of the so-called quick coupler mechanisms. As shown in the drawing, the male coupler has an enlarged head 164 and the female coupler has a plurality of fingers 165 which will snap over the enlarged head when the elements are brought together. A spring-pressed sleeve 166 will be drawn back to allow the spring fingers to either engage or disengage the male element and when released will move forward to overlie the spring fingers and prevent the coupling elements from separating. The female element will carry a valve member 167 which will automatically close when the lines are separated so that pressure can be held in the air bag during movement of the shelf and which will be automatically opened when the coupling elements are engaged. As stated above, any conventional quick coupler which when coupled will be locked together will serve the purpose.

It will be evident that with the modified structure the shelf cannot be moved from its retracted position until the coupler is released. When the shelf is returned to its position on the guide rails, the coupler sleeve will be drawn back and as the shelf moves into its retracted position the coupler elements will automatically engage so as to couple the air bag to the air manifold. When the coupler sleeve is released, the shelf will be held against movement out of the rack.

In FIGURES 19 and 20, a modified arrangement of rail for the loader is shown. Only that section of the rail adjacent the rack has been illustrated. The rails 95′ are provided with notches, or recesses, 168 which are spaced apart along the rails the proper distance to receive the wheels of the loader. It will be evident that when the loader is moved to the left as viewed in FIGURE 19, the four loader wheels will drop into the notches 168 and hold the loader in proper position relative to the track and in consequence thereof in proper position relative to the rack. It will be understood that the opposite end of the track (not shown) will be of identical construction so that the loader will be held in its displaced position against movement toward the rack. This arrangement is much cheaper than the arrangement previously described but will be very effective in its operation of holding the loader in its two extreme positions.

While in the above practical embodiments of the invention have been disclosed, it will be understood that the details of construction described and shown are merely by way of illustration, and the invention may take other forms within the scope of the appended claims.

What is claimed is:

1. Apparatus for handling and storing tire recapping matrices comprising, a storage rack having a plurality of pairs of horizontally spaced rails mounted at vertically spaced levels in the rack, shelves for matrices supported on the rails for movement there along, the rack being open at one side at one end of the rails to permit shelves to slide out, releasable locking means on the rack at each rail level to engage the shelves to hold the shelves within the rack, vertical tracks along the open side of the rack, a lift mounted on the track for vertical movement, means for raising and lowering the lift, rails on the lift spaced horizontally to form continuations of the rack rails when the lift is at the level of the rack rails to allow the shelves to slide out of the rack onto the lift, and means carried by the lift engageable with the locking means at each of the rack rail levels as the lift moves vertically into horizontal alignment with the respective rack rails to release the locking means at the level with which the lift is in alignment to free the shelf at that level for sliding movement to and from the lift.

2. Apparatus for handling and storing tire recapping matrices as claimed in claim 1 wherein, the lift carries a stop located in the path of shelves sliding onto the lift to limit the movement of shelves, and there is a releasable latch on the lift to engage shelves on the lift and hold them against the stop, whereby each shelf drawn onto the lift will be held in fixed predetermined position relative to the lift.

3. Apparatus for handling and storing tire recapping matrices as claimed in claim 1 wherein, the means for raising and lowering the lift including a motor, a control circuit for the motor having a plurality of normally closed switches in series, one switch positioned at each of the rack rail levels adjacent the lift track, means on the lift to contact and open the respective switches to stop the motor as the lift moves to the respective rack levels, and a by-pass circuit bridging said switches and including a manually operable normally open switch, whereby closing of the manually operable switch will render the normally closed switches ineffective to stop motor operation when opened by contact of the means on the lift for opening the switches.

4. Apparatus for handling and storing recapping matrices as claimed in claim 1 wherein, the rack carries flexible and extensible electric power conducting means adjacent each rail level for connection to matrices on the shelves, and there are outlets for air under pressure adjacent each rail level.

5. Apparatus for handling and storing tire recapping matrices as claimed in claim 4 wherein, the lift carries a stop located in the path of shelves sliding onto the lift to limit the movement of shelves, and there is a releasable latch on the lift to engage the shelves to hold them against the stop, whereby each shelf drawn onto the lift will be held in fixed predetermined position relative to the lift.

References Cited in the file of this patent

UNITED STATES PATENTS

| | | |
|---|---|---|
| 1,118,503 | McLeod | Nov. 24, 1914 |
| 1,407,193 | Diescher | Feb. 21, 1922 |
| 1,599,227 | Gantvoort | Sept. 7, 1926 |
| 1,840,490 | Denmire | Jan. 12, 1932 |
| 2,238,534 | McDonald | Apr. 15, 1941 |
| 2,341,434 | Forbes | Feb. 8, 1944 |
| 2,484,419 | Miner | Oct. 11, 1949 |
| 2,526,823 | Mansfield | Oct. 24, 1950 |
| 2,541,659 | McGovern | Feb. 13, 1951 |
| 2,635,771 | Black | Apr. 21, 1953 |
| 2,661,496 | Lubenow | Dec. 8, 1953 |
| 2,899,040 | Smith et al. | Aug. 11, 1959 |
| 2,923,527 | Fannen | Feb. 2, 1960 |
| 2,954,882 | Dailey | Oct. 4, 1960 |